Nov. 18, 1958     W. B. ZELINA     2,861,237
TRANSISTOR SWITCH VOLTAGE REGULATOR
Filed April 19, 1956
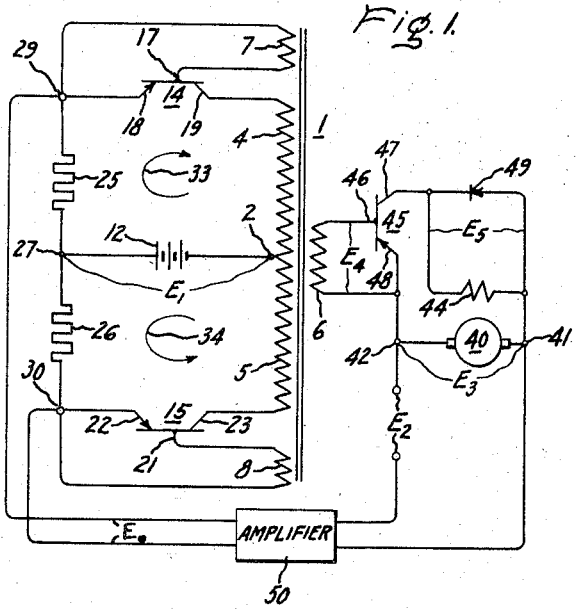
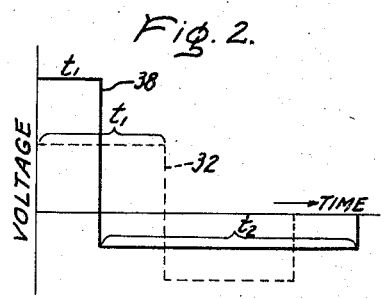
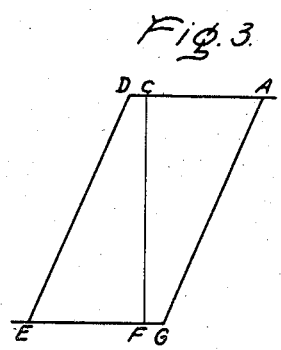
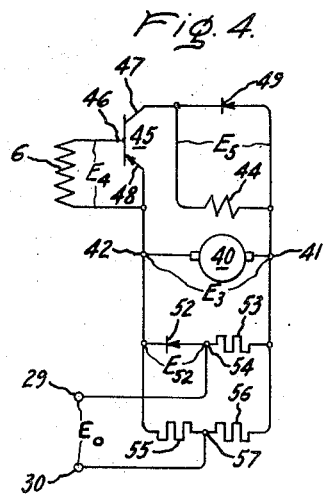
Inventor:
William B. Zelina,
by David P. Ogden
His Attorney.

United States Patent Office 2,861,237
Patented Nov. 18, 1958

2,861,237

TRANSISTOR SWITCH VOLTAGE REGULATOR

William B. Zelina, Erie, Pa., assignor to General Electric Company, a corporation of New York Application April 19, 1956, Serial No. 579,216

16 Claims. (Cl. 322—28)

This invention relates to a voltage regulator for a unidirectional generator and more particularly to the use of a voltage regulating system.

In the past, industry has continuously searched for simple and rugged unidirectional control systems. Each such system has severe limitations. For instance, the use of the amplistat as a static amplifying element in unidirectional voltage regulators had a disadvantage of requiring an alternating current voltage supply. The use of the carbon pile as a static voltage regulating element has disadvantages of relatively slight amplification and of the unpredictable behavior of the carbon pile. Even the most popular voltage regulator for moderate sized unidirectional generators, the vibrating or moving contact type, has the disadvantage of utilizing moving parts which require periodic maintenance and repair. One of the most recently developed systems based on germanium transistors as amplifying elements for a direct current voltage regulator has been limited because of the objectionable thermal variation of the germanium transistor.

Therefore, an object of my invention is a simple and reliable voltage regulator overcoming all of the above mentioned difficulties.

In carrying out my invention in one form, a rectangular wave oscillator having a mutual magnetic feedback provides an output voltage having integrated value of zero wherein the positive half-cycle time to the negative half-cycle time may be modulated by a control signal. Positive half-cycles of this output voltage enhance current flow in a transistor to operate it as a switch and thus overcome the temperature instability problem associated therewith. In this way, the transistor is always operating in the completely turned off or completely turned on stage both of which are low power dissipation stages. The transistor intermittently connects a field excitation winding of a dynamoelectric machine to a power supply, thus controlling the average excitation and the output voltage of the machine. The output voltage, in turn, controls half cycle time duration ration of the oscillator to control the average time of conductance of the transistor.

Further objects and advantages of my invention will become apparent and my invention will be better understood from the following detailed description with reference to the accompanying drawings. The features of novelty will be pointed out with particularity in the claims annexed to and forming part of the specification.

In the drawings,

Fig. 1 is a schematic circuit of one embodiment of my voltage regulator used in conjunction with a unidirectional generator;

Fig. 2 shows the output wave shapes produced by the saturable transformer circuit shown in Fig. 1 with the ordinate scale in volts and the abscissa scale in time;

Fig. 3 shows the flux excursion hysteresis loop of the transformer core of Fig. 1; and Fig. 4 is a schematic diagram showing a modification of my invention.

Referring now to the drawings, in Fig. 1, I have shown a saturable transformer 1 having a primary winding which is divided into two equal winding portions 4 and 5 by a center tap 2. In order to provide the proper switching action, the winding portions 4 and 5 are wound cumulatively on the core of the transformer 1. The transformer 1 also is provided with a secondary or output winding 6 and tertiary or switching windings 7 and 8. With the saturable transformer circuit of Fig. 1, the windings 6, 7 and 8 each produce a rectangular wave voltage output as shown in Fig. 2.

Each of the primary winding portions 4 and 5 is connected through the center tap 2 to one terminal of a battery 12 and at one end to a collector electrode of similar transistors junction 14 and 15 respectively. The transistor 14 is provided with a base electrode 17, an emitter electrode 18, and a collector electrode 19. The transistor 15 is provided with a base electrode 21, an emitter electrode 22 and a collector electrode 23. A voltage divider shown as the similar resistors 25 and 26 is connected between the emitter electrodes 18 and 22. The other terminal of the battery 12 is connected to a center tap 27 of the voltage divider 25—26.

The battery 12, the resistor 25, a junction 29, the transistor 14 and the primary winding 4 are connected in a circuit 33 which is conductive during a half cycle when the transistor 14 is turned on. The battery 12, the resistor 26, a junction 30, the transistor 15 and the primary winding 5 are connected in a loop circuit 34 which is non-conductive during the same half cycle.

It is well known that a relatively low switching voltage will remove the barrier layer of a transistor to turn it "on." In order to switch the transistors 14 and 15 "on" or "off," the tertiary or switching winding 7 is connected between the base electrode 17 and the emitter electrode 18 in a sense to enhance current flow therethrough during each half cycle the transistor 14 is conducting current and inhibit current flow during the other half cycle when the transistor 15 is conducting current, and the similar tertiary winding 8 is connected between the base electrode 21 and the emitter electrode 22 to inhibit current flow in the transistor 15 during the one half cycle and to enhance current flow therein during the other one half cycle. These connections result in a rectangular wave oscillator which might be termed an inductor transistor flip-flop oscillator.

Oscillator operation

Assume that the battery voltage $E_1$ is the only voltage connected to the oscillator and that the inherent conditions of the circuit are such that the transistor 14 starts conducting. Under these conditions, the tertiary winding 7 is coupled magnetically to the primary winding portion 4 to enhance current flow in the transistor 14. Similarly, the tertiary winding 8 is magnetically coupled to the primary winding portion 4 to inhibit current flow in the transistor 15.

Current will continue to flow in the loop 33, including the turned on transistor 14, until the transformer 1 is saturated at point A as shown in Fig. 3. Since the impedance of a conducting transistor will be small compared with the magnitude of switching voltage contemplated, the magnitude of the current in loop 33 is controlled by the impedance of the resistor 25 and the inductance of the primary winding 4. In order to provide a continually increasing current that is limited primarily by the impedance of the inductance in the circuit, the resistor 25 is made proportionately small compared to the inductance of the winding portion 4. When the transformer core is saturated by this increasing current, the flux change of the core drops to zero and the winding 7 will no longer have induced therein a switching voltage enhancing current flow in the transistor 14. At this time, the impedance of the transistor 14 will increase and reduce the current in the loop 33.

This reduced current in the primary winding 4 causes the core flux to drift toward the point C (Fig. 3). This drift, occurring in less than a microsecond, induces a voltage in the tertiary winding 8 to enhance current flow in the transistor 15. When this happens, $E_1$ causes current to flow in the loop 34 from the battery 12 through the resistor 26, the junction 30, the turned-on transistor 15 and the primary winding portion 5. The transformer core again becomes saturated after having gone through the portion of the flux excursion curve CDE (Fig. 3). When this occurs, the tertiary winding 8 will no longer produce a voltage to promote current flow in the transistor 15, the flux will drift from E to F and the impedance of the transistor 15 will immediately increase to thus reverse the flux excursion and repeat the cycle.

With no voltage applied between junctions 29—30, the output of this oscillator circuit is induced in the winding 6 as shown in Fig. 2 by a dashed line 32. It should be noted that this curve 32 is a rectangular wave output wherein the positive and negative half cycles are equal in voltage and time duration. Because of the fact that the volt-seconds necessary to drive the transformer 1 from positive to negative saturation are determined by the physical properties of the transformer and must equal the negative to positive volt-seconds, the volt-seconds of the positive and negative half cycles must always be equal. The symmetry is provided by choosing the similar circuit components to be identical. Thus, I prefer that the impedance of the transistors 14 and 15 are equal and the charactertistics of the winding portions 4 and 5 are identical.

The flux excursion of the core of the transformer 1 is from a positive saturation to the negative saturation C, D, E (Fig. 3) and from the negative saturation to the positive saturation F, G, A during each half cycle period respectively. At any time the transformer 1 has reached saturation, the voltage previously induced in a tertiary winding goes to zero. As the flux drifts out of saturation (A to C or E to F), the polarity of all induced voltages reverses as shown in Fig. 2 by the vertical line between positive and negative half cycles on the time scale.

Secondary control network

In Fig. 1, I have also shown a unidirectional generator 40 having connected thereto output terminals 41 and 42. A field winding 44 excites the generator 40. In order to provide voltage control, the terminal 41 is connected directly to the junction 30 and the terminal 42 is connected through a reference or control voltage $E_2$ to the junction 29. Any differential voltage between terminal voltage $E_3$ and $E_2$ will modulate the oscillator half cycle time duration by changing the ratio of the voltages applied to the loop circuits 33 and 34 which changes the time required to saturate the transformer, causing an unbalance in the oscillator which results in the wave shape 38 (Fig. 2). I shall define the differential or control signal $E_0$ as positive when $E_3$ is greater than $E_2$.

In the secondary network of the oscillator, a junction transistor 45 is provided with a base electrode 46, a collector electrode 47 and an emitter electrode 48. The base and emitter electrodes are connected to the secondary winding 6 in a sense which will enhance current flow in the transistor 41 during any half cycle of the oscillator which removes the transistor barrier layer. I shall arbitrarily call this half cycle positive which turns on the transistor 45. With this arrangement, the field winding 44 of the generator 40 carries current at any time a voltage $E_4$ is induced in the tertiary winding 6 in a sense to turn on the transistor 45.

Thus, the transistor acts like an electronic switching device. Of course, other devices will be or are being developed, which will provide electronic switching action which may be used to intermittently connect a power supply to a load such as a control winding. One such device, the lumister, is provided with a photoelectric element adjacent to a phosphorescent element. When a signal energizes the phosphorescent element, the photoelectric element becomes conductive.

It should be noted that the output voltage wave shape 32 (shown in Fig. 2) will allow the transistor 45 to conduct only for the half cycle period $t_1$ so that the voltage applied to the field winding 44 will actually be fluctuating. However, because of the combined action of the induction of winding 44 and a commutating rectifier 49, the current flowing through field winding 44 will not fluctuate appreciably even at switching frequencies as low as 100 cycles per second. The rectifier 49 is selected to have a low impedance during the forward conducting period, and when the transistor 45 is turned off, this arrangement will reduce the impedance in circuit with the winding 44, to effectively stop the decay of the field current to prevent a fluctuating or ripple current in the field winding 44 of the generator 40.

It is apparent from the circuit shown in Fig. 1 that the function of the rectangular wave oscillator portion of the circuit is to induce an alternating switching voltage $E_4$ in the tertiary winding 6. The half cycle time duration of this switching voltage may be modulated to control the average impedance of the transistor 45.

The positive half cycle of the voltage $E_4$ as shown in Fig. 2 will dictate the time $t_1$ during which the transformer 1 is saturating in one polarity when the transistor 45 is turned on, making $t_2$ the turned off time of transistor 45 when the transformer 1 is saturating in the other polarity.

Because of the low impedance of the conducting transistor 45, a voltage $E_5$ across the field winding 44 is substantially equal to the generator voltage $E_3$ when the transistor 45 is turned on. The voltage $E_5$ across the parallel circuit including the rectifier 49 and the field winding 44 will be equal to zero when the transistor 45 is turned off. This varying voltage causes an average current in the winding 44, and this current is proportional to the average voltage $E_5$. The average voltage $E_5$ is shown mathematically as:

(1) $$E_5 = E_3 t_1 / (t_1 + t_2)$$

or, when $t_1 = t_2$ as shown by curve 32 (Fig. 2), I may show that:

(2) $$E_5 = E_3 / 2$$

For the purpose of mathematical evaluation of what occurs when a modulating differential signal $E_0$, which is the difference between the reference voltage $E_2$ and the generator voltage $E_3$, is applied to the junctions 29 and 30 to change the ratio of $t_1$ to $t_2$, I shall use the following definitions. The change in the flux of the transformer caused by the primary winding portions having N turns is always equal to two times the saturation flux density of the iron times the effective cross-sectional area of the core, and is essentially constant under all conditions contemplated for a given saturable transformer. I shall designate this quantity herein as Y. A reactive voltage induced in the loop 33 equals $V_{33}$, and a reactive voltage induced in the loop 34 equals $V_{34}$.

Assuming a negligible voltage drop across the voltage divider resistor 25 and the conducting transistor 14 for the relatively small currents involved, one can show the voltage for the loop circuit 33 as follows:

(3) $$V_{33} = NY / t_1$$

and (4) $$V_{33} = E_1 + (E_3 - E_2)/2 = E_1 + E_0/2$$

Similarly, for loop 34, one can write:

(5) $$V_{34} = NY / t_2$$

and (6) $\quad V_{34}=E_1-(E_3-E_2)/2=E_1-E_0/2$

Then, from the solutions of Equations 3 through 6, for $t_1$ and $t_2$, one obtains:

(7) $\quad t_1=2NY/(2E_1+E_3-E_2)=2NY/(2E_1+E_0)$ and (8) $\quad t_2=2NY/(2E_1-E_3+E_2)=2NY/(2E_1-E_0)$ Thus, it is clear that any error voltage $E_0$ (differential between $E_3$ and $E_2$) will cause a change in the ratio of the half cycle periods $t_1$ and $t_2$ to obtain an induced voltage wave shape 38 (Fig. 2) that is no longer symmetric. However, the voltage times time (volt-seconds) or area under each half cycle portion of the curve remains constant, depending on the constant quantity NY.

If the expressions for $t_1$ and $t_2$ given by the Equations 7 and 8 are substituted into Equation 1, the expression for the average field voltage $E_5$ of the generator becomes:

(9) $\quad E_5=E_3/2-E_3(E_3-E_2)/4E_1=E_3/2-E_3E_0/4E_1$ or, if I write the fraction ¼ of the second term as K:

(10) $\quad E_5=E_3/2-KE_3(E_3-E_2)/E_1=E_3/2-KE_0E_3/E_1$

Hence, Equation 9 shows that the average field winding voltage $E_5$ is a function of the generator voltage $E_3$, the error voltage $E_0$, and the battery voltage $E_1$. Thus, a regulator is effected. The oscillator circuit current or battery voltage $E_1$ can be made very small by judicious design. If this is done, large changes in the generator field voltage $E_5$ will be obtained with relatively small changes of error voltage, hence an accurate voltage regulator is effected.

Assume $E_2$ equals 100 voltage, $E_1$ equals 10 volts and $E_3$ is 100 volts. According to definition $E_0$ is zero and according to the Equations 1, 2, 9 and 10, $E_5$ equals 50 volts. In this case, the generator 40 is so wound that this is the proper excitation to maintain this voltage for this particular load. With no load $E_3$ may increase to 104 volts, resulting in an error voltage $E_0$ equal to 4 volts. Thus, by Equation 9 $E_5$ now equals 52 volts minus 10.4 volts or 41.6 volts. If $E_1$ is decreased to 5 volts, the last term of the equation is doubled and $E_5$ drops to 31.2 volts with this error.

If further accuracy is desired, an amplifier 50 may be inserted to amplify the error voltage $E_0$ to modify the oscillator half cycle time ratio. Such an amplifier would change the constant K of Equation 10 from its value of ¼ to some value such as ten, depending on the characteristics of the amplifier 50. This amplifier may be amplistat or other device of this type. Thus, with K equal to ten, $E_1$ equal to 10 volts and an error voltage of .1 volt, Equation 9 shows that $E_5$ now equals 50 volts minus 10 volts, or 40 volts.

Any convenient voltage reference source can be used with this regulator. A battery, or a constant voltage impedance will provide the desired reference. However, I prefer to use a constant voltage impedance that does not depend on or have the losses of a battery. Therefore, I have shown in Fig. 4 an error detector based on a Zener diode 52 which performs well.

Referring now to Fig. 4, I have shown the generator 40 of Fig. 1 with a Zener diode 52 and a resistor 53 serially connected between the generator terminals 41 and 42 to provide a signal network. The Zener diode 52 is a silicon diode connected in the circuit in the reverse direction and adapted to break down at a selected voltage, in this case a reference voltage $E_{52}$ which is equal to some voltage less than the desired voltage $E_3$. The circuit parameters of the diode 52 and the resistor 53 are so chosen that the resistor 50 has a much greater impedance than the conducting diode. The junction 29 is connected to a voltage tap 54 between the Zener diode 52 and the resistor 53.

The resistors 55 and 56 act as a voltage divider having its ends connected respectively to the terminals of the generator 41 and 42 and having a center tap 57 connected directly to the junction 30 so that the voltage drop across resistor 55 is equal to $E_{52}$ when $E_3$ is equal to the desired regulated value. Thus, if resistors 55 and 56 are equal, $E_{52}$ should equal half of the desired value of $E_3$.

It is apparent that this circuit acts as an error detector, hence if the generator voltage $E_3$ is too low, junction 29 becomes positive with respect to junction 30 which causes $t_1$ to be greater than $t_2$. This increases $E_5$. When the generator voltage is too high, $t_1$ becomes less than $t_2$ since junction 29 now becomes negative with respect to junction 30 and $E_5$ is reduced.

This arrangement eliminates the necessity for a separate source of reference voltage $E_2$ as shown in Fig. 1. It should be noted that with the same general conditions stated in regard to Fig. 1, when the voltage $E_3$ is equal to 104 volts instead of the desired value of 100 volts, and $E_{52}$ is equal to 50 volts, the error voltage $E_0$ would be only 2 volts. Thus, according to Equation 9, $E_5$ equals 52 volts minus 5.2 volts, or 46.8 volts. Of course, it may be desirable to add to the circuit shown in Fig. 4 an amplifier similar to the one shown as 50 in Fig. 1.

While I have shown and described the particular embodiments of my invention, further modifications and improvements will appear to those skilled in the art. For instance, it might be desirable to regulate the voltage of an alternator or A. C. machine with my invention. This could easily be done by incorporating rectifiers to provide the proper unidirectional signals. I desire it understood, therefore, that my invention is not limited to the form shown and I intend by the appended claims to cover all modifications which do not depart from the true spirit and scope of my invention.

What I claim as new and desire to secure by Letters Patent of the United States is:

1. A voltage regulator network for controlling the voltage of a dynamoelectric machine comprising a saturable transformer having a primary winding provided with a center tap thereby providing two equal primary portions, said transformer having a secondary winding and two tertiary windings, a pair of junctions, a pair of transistors each connected to one of said tertiary windings respectively in a sense whereby flux excursion of said transformer in either direction alternately promotes current flow in one of said pair and inhibits current flow in the other of said pair, said transistors being connected serially between said junctions and said primary winding for allowing current flow alternately from one of said junctions to one of said primary portions respectively, a pair of resistors of equal value connected serially between said junctions, a battery connected at one end to said center tap and at its other end to a voltage tap between said resistors, a pair of output terminals of the unidirectional dynamoelectric machine adapted to be connected across said junctions in a sense whereby the output voltage modulates the time duration of half cycles of the output voltage of said transformer, a reference voltage connected between one of said terminals and one of said junctions in a sense to counteract voltage of said machine, a field winding connected to one of said terminals for energizing said generator, a third transistor connected to said secondary winding in a sense to enhance current flow therein during periods when a positive voltage is induced therein, said transistor being arranged in circuit with said field winding for connecting said field winding to said other terminal whereby an error voltage equal to the difference between said generator voltage and said reference voltage determines the percentage of the time that said field winding is energized.

2. A transistor voltage regulator for a unidirectional electric machine comprising a saturable transformer having a primary winding provided with a center tap thereby providing two equal primary winding portions, said transformer having a secondary winding and two tertiary windings, a pair of transistors connected to said tertiary windings in a sense whereby induced voltages of said tertiary windings alternately enhance current flow therein, a pair of junctions, a pair of equal resistors connected serially between said junctions, terminals between said center tap and a voltage tap between said resistors for applying a voltage, said transistors being connected serially between said junctions and said primary winding for allowing current flow alternately in one of said primary portions respectively, said transformer, said transistors and said voltage adapted to operate as an oscillator having an output voltage across said secondary winding, a pair of voltage terminals of the machine adapted to be connected to said junctions to provide a control voltage for modulating half cycle time duration of said oscillator, a reference voltage signal connected in circuit with said terminals and one of said junctions to modify said control voltage, a field winding connected to one of said pair of terminals for energizing said generator, a third transistor connected to said oscillator in a sense whereby an output voltage of said secondary winding will enhance current flow in said third transistor during positive half cycles thereof, said transistor being arranged in circuit with said field winding for connecting said field winding to the other of said terminals whereby an error voltage equal to the difference between said generator terminal voltage and said reference voltage signal determines the percentage of the time that said field winding is energized.

3. A transistor voltage regulator for a unidirectional electric machine comprising a saturable transformer having a primary winding provided with a center tap thereby providing two equal primary portions, said transformer having a secondary winding and two tertiary windings, a pair of junctions, a pair of transistors connected to said tertiary windings in a sense whereby induced voltages of said tertiary windings alternately enhance current flow in each of said pair, said transistors being connected serially between said junctions and said primary winding for allowing current flow alternately in one of said primary portions respectively, a pair of equal resistors connected serially between said junctions, a battery connected at one end to said center tap and at its other end to a voltage tap between said resistors, a pair of voltage terminals of the machine adapted to be connected to said junctions to provide a control voltage for modulating half cycle time duration of said oscillator, a reference voltage signal connected in circuit with said terminals and one of said junctions to modify said control voltage, a field winding connected to one of said pair of terminals for energizing said generator, a third transistor connected to said oscillator in a sense whereby an output voltage of said secondary winding will promote current flow in said third transistor during positive half cycles thereof, said transistor being arranged in circuit with said field winding for connecting said field winding to said other terminal whereby an error voltage equal to the difference between said generator terminal voltage and said reference voltage signal determines the percentage of the time that said field winding is energized.

4. A transistor voltage regulator for a unidirectional electric machine comprising a saturable transformer having a primary winding provided with a center tap thereby providing two equal primary winding portions, said transformer having a secondary winding and two tertiary windings, a pair of transistors connected to said tertiary windings in a sense whereby induced voltages of said tertiary windings alternately enhance current flow therein, a pair of junctions, a pair of resistors connected serially between said junctions, terminals between said center tap and a voltage tap between said resistors for applying a voltage, said transistors being connected serially between said junctions and said primary winding for allowing current flow alternately from said battery through one of said primary portions respectively, a pair of voltage terminals of the machine adapted to be connected to said junctions to provide a control voltage for modulating half cycle saturation time of said transformer and thereby the proportion of time the output of said secondary wing is positive, a reference signal connected in circuit with said terminals to modify said control voltage, a field winding connected to one of said pair of terminals for energizing said generator, a third transistor connected said secondary winding in a sense whereby a positive output voltage will enhance current flow in said third transistor, said transistor being arranged in circuit with said field winding for connecting said field winding to the other of said terminals whereby an error voltage equal to the difference between said generator terminal voltage and said reference signal determines the percentage of the time that said field winding is energized.

5. A voltage regulator for a dynamoelectric machine comprising a rectangular wave oscillator, a switching device connected to receive positive half cycles of the output voltage of said oscillator in a sense to enhance current flow through said device, a dynamoelectric machine having a unidirectional current excitation field winding, said switching device and said field winding being serially connected across a source of power to energize said winding whenever said device passes current therethrough, and means including a reference signal connected to said oscillator for modulating the wave shape output to thereby vary the proportion of time that said switching device passes current.

6. A voltage regulator for a dynamoelectric machine comprising a rectangular wave oscillator having an alternating output voltage, a switching device connected to receive positive half cycles of the output voltage of said oscillator in a sense to enhance current flow through said device, a dynamoelectric machine having a unidirectional current excitation field winding, said switching device and said field winding being serially connected across a source of power to energize said winding whenever said device passes current therethrough, a reference signal, a signal proportional to the output voltage of the machine, electric circuit means for comparing said signals to provide an error signal, other electric circuit means for connecting said error signal to said oscillator to modulate the half cycle time duration and the proportion of time that said switching device passes current.

7. A voltage regulator for a dynamoelectric machine comprising a rectangular wave oscillator having an alternating output voltage, a transistor connected to said output voltage in a sense whereby positive half cycles enhance current flow therein, a unidirectional current field winding adapted to excite the machine, said transistor and said field winding being serially connected across a source of power in a sense which will energize said winding whenever said transistor is conductive, and means for connecting a control voltage to said oscillator for modulating the ratio of the half cycle time durations to thereby vary the proportion of time that said transistor is conductive.

8. A voltage regulator for a unidirectional electric machine comprising, a high frequency rectangular wave oscillator having an alternating voltage output, an electronic switch connected to the output voltage of said wave oscillator in a sense to enhance current flow in said switch during positive half cycles of said voltage, a winding adapted to create a field in the machine, electric circuit means for connecting said switch and said field winding connected across a source of voltage in a sense whereby said field winding is energized thereby when said switch is conductive, electric circuit means connecting a reference signal in circuit with voltage terminals of the machine to provide a differential signal, electric circuit means for connecting said differential signal to modulate the wave shape of said voltage output of said oscillator to thereby vary the proportion of time that said switch is conductive and said winding is energized.

9. A transistor voltage regulator for a unidirectional electric machine comprising, a high frequency rectangular wave oscillator having an output voltage characterized by the absence of any substantial unidirectional component, a transistor having a base electrode and an emitter electrode connected to said output voltage in a sense to enhance current flow in said transistor during positive half cycles of said voltage, a winding adapted to create a field in the machine, electric circuit means for connecting said transistor and said field across a source of voltage in a sense whereby said field winding is energized thereby when said transistor is conductive, and means including a reference voltage connected to said oscillator for modulating the wave shape of said output voltage to thereby vary the proportion of time that said transistor is conductive and said winding is energized.

10. A voltage regulator for an electric machine comprising, a transistor rectangular wave oscillator having an alternating output voltage characterized by the absence of any substantial average unidirectional component, an electronic switch connected to said output signal in a sense whereby positive half cycles enhance current flow therethrough, a field winding adapted to energize the machine, said switch and said winding being connected serially across a source of unidirectional power in a sense whereby said winding will be energized thereby when said switch is conductive, electric circuit means connected to a reference signal and an output voltage signal of the machine for deriving a differential signal, an amplifier adapted to increase said signal, electric circuit means connecting said differential signal to said oscillator for modulating the wave shape output to thereby vary the proportion of time that said switch is conductive and said winding is energized by said source.

11. A transistor voltage regulator for a unidirectional generator comprising, a rectangular wave oscillator having an alternating output voltage characterized by the absence of any substantial unidirectional component, a transistor connected to said output signal in a sense whereby positive half cycles enhance current flow therethrough, a field winding adapted to energize the generator, said transistor and said winding being connected serially across voltage terminals of said generator in a sense whereby said winding will be energized thereby when said transistor is conductive, means connected in circuit with said terminals for deriving a differential signal when the terminal voltage is other than a predetermined value, and electric circuit means connecting said differential signal to said oscillator for modulating the wave shape of said output voltage to thereby vary the proportion of time that said switch is conductive and said winding is energized by said source.

12. A transistor voltage regulator for a unidirectional generator comprising, a rectangular wave oscillator having an output voltage characterized by the absence of any substantial unidirectional component, a transistor connected to said output signal in a sense whereby positive half cycles enhance current flow therethrough, a field winding adapted to energize the generator, said transistor and said winding being connected serially across voltage terminals of said generator in a sense whereby said winding will be energized thereby when said transistor is conductive, means connected in circuit with said terminals for deriving a differential signal when the terminal voltage is other than a predetermined value, electric circuit means connecting said differential signal to said oscillator for modulating the wave shape of said output voltage to thereby vary the proportion of time that said switch is conductive and said winding is energized by said source, and commutating means connected in circuit with said winding for integrating the voltage thereacross.

13. A transistor voltage regulator for a unidirectional electric generator comprising, a rectangular wave oscillator having an output voltage characterized by the absence of any unidirectional component, a transistor connected to said output voltage in a sense to enhance current flow in said transistor during positive pulses of said output voltage, a field winding of the generator connected to one voltage terminal of the generator and adapted to be connected to the other voltage terminal to be energized thereby by said transistor when conductive, a voltage divider connected across said terminals, said divider having a voltage tap thereon adapted to provide a potential proportional to the terminal voltage of the machine, a diode, a resistor, said diode and said resistor connected across said terminals in a sense whereby said terminal voltage tends to cause reverse current flow in said diode, a voltage tap between said resistor and said diode, said resistor having an impedance greater than the impedance of said diode when said diode is conducting in the reverse direction whereby the voltage of a tap between said diode and said resistor is maintained at a value dependent on the breakdown voltage of said diode, and means for connecting said taps to said oscillator for modulating the relative time duration of said pulses thereby controlling the average time of conducting of said transistor.

14. A transistor voltage regulator for a unidirectional electric generator comprising, a rectangular wave oscillator having an output voltage characterized by the absence of any unidirectional component, a transistor connected to said output voltage in a sense to enhance current flow in said transistor during positive pulses of said output voltage, a field winding of the generator connected to one voltage terminal to be energized thereby by said transistor when conductive, a voltage divider connected across said terminals, said divider having a voltage tap thereon adapted to provide a potential proportional to the terminal voltage of the machine, a diode, a resistor, said diode and said resistor connected across said terminals in a sense whereby said terminal voltage tends to cause reverse current flow in said diode, a voltage tap between said resistor and said diode, said resistor having an impedance greater than the impedance of said diode when said diode is conducting in the reverse direction whereby said voltage of a tap between said diode and said resistor is maintained at a value dependent on the breakdown voltage of said diode, means for connecting said taps to said oscillator for modulating the relative time duration of said pulses thereby controlling the average time of conducting of said transistor, and a diode connected across said field winding in absence to pass current of said winding when said transistor is non-conductive for commutating said field winding thereby reducing ripple currents in said winding.

15. A transistor voltage regulator for a unidirectional current generator comprising, a rectangular wave oscillator having an alternating output voltage, said voltage having an integrated value of zero, a pair of voltage terminals on said generator, a reference voltage, said voltage terminals and said reference voltage being serially connected to provide a differential signal, electric circuit means connecting said signal to said oscillator in a sense for modulating the respective time duration of alternate half cycles of said output voltage, a field winding of said generator having one side connected to one of said pair of terminals, and a transistor connected to said oscillator in a sense to enhance current flow therethrough during positive half cycles of said output voltage for connecting the other side of said field winding to the other of said terminals whereby said differential signal determines the percentage of the time that said transistor connects said winding to said other terminal.

16. A transistor voltage regulator for a unidirectional current generator comprising, a rectangular wave oscillator having an alternating output voltage, said voltage having an integrated value of zero, a pair of voltage terminals on said generator, a reference voltage, electric circuit means for connecting said voltage terminals and said reference voltage to provide a differential signal, an amplifier connected in circuit with said differential signal for providing a control signal, connections between said oscillator and said amplifier whereby said control signal modulates the respective time duration of alternate half cycles of said output voltage, a field winding of said generator having one side connected to one of said pair of terminals, a transistor connected to said oscillator in a sense to enhance current flow therethrough during positive half cycles of said output voltage, said transistor being connected between said winding and the other of said terminals for connecting the other side of said field winding to said other terminal whereby said differential signal determines the percentage of the time that said field winding is energized.

References Cited in the file of this patent

UNITED STATES PATENTS

| | | |
|---|---|---|
| 2,666,885 | Bradley et al. | Jan. 19, 1954 |
| 2,740,086 | Evans et al. | Mar. 27, 1956 |
| 2,760,088 | Pittman et al. | Aug. 21, 1956 |

UNITED STATES PATENT OFFICE
CERTIFICATE OF CORRECTION

Patent No. 2,861,237                                           November 18, 1958

William B. Zelina

It is hereby certified that error appears in the printed specification of the above numbered patent requiring correction and that the said Letters Patent should read as corrected below.

Column 8, line 8, for "wing" read -- winding --; line 12, after "connected" insert -- to --.

Signed and sealed this 20th day of October 1959.

(SEAL)
Attest:

KARL H. AXLINE                                               ROBERT C. WATSON
Attesting Officer                                          Commissioner of Patents